US012323049B2

(12) United States Patent
Schiedermeier

(10) Patent No.: US 12,323,049 B2
(45) Date of Patent: Jun. 3, 2025

(54) ELECTRICAL CIRCUIT ARRANGEMENT, MOTOR VEHICLE, AND METHOD FOR OPERATING AN ELECTRICAL CIRCUIT ARRANGEMENT

(71) Applicant: AUDI AG, Ingolstadt (DE)

(72) Inventor: Maximilian Schiedermeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 18/191,823

(22) Filed: Mar. 28, 2023

(65) Prior Publication Data

US 2023/0318441 A1 Oct. 5, 2023

(30) Foreign Application Priority Data

Mar. 30, 2022 (DE) .................... 10 2022 107 475.7

(51) Int. Cl.
*B60L 50/60* (2019.01)
*B60L 50/70* (2019.01)
(Continued)

(52) U.S. Cl.
CPC ............... *H02M 1/15* (2013.01); *B60L 50/60* (2019.02); *B60L 50/70* (2019.02); *B60L 53/20* (2019.02); *H01M 8/04* (2013.01); *H01M 10/4264* (2013.01); *H02M 7/4818* (2021.05); *H02M 7/5387* (2013.01); *H02P 27/06* (2013.01);
(Continued)

(58) Field of Classification Search
CPC .... H02M 1/15; H02M 7/4818; H02M 7/5387; H02M 1/14; B60L 50/60; B60L 50/70; B60L 53/20; B60L 2210/10; B60L 2260/42; B60L 2260/44; B60L 2270/147; B60L 15/007; H01M 8/04; H01M 10/4264;
(Continued)

(56) References Cited

U.S. PATENT DOCUMENTS

2015/0244306 A1* 8/2015 Estes ................ H02S 40/32
 700/287
2017/0063411 A1* 3/2017 Ripley ................ H04B 1/1036
(Continued)

FOREIGN PATENT DOCUMENTS

DE 10 2006 043 833 A1 3/2008
DE 10 2012 220 247 A1 5/2014
(Continued)

OTHER PUBLICATIONS

Office Action, dated Nov. 4, 2022, for German Patent Application No. 10 2022 107 475.7 (6 pages).

*Primary Examiner* — Elim Ortiz
*Assistant Examiner* — Xuan Ly
(74) *Attorney, Agent, or Firm* — Seed IP Law Group LLP

(57) ABSTRACT

An electrical circuit arrangement is provided comprising an inverter and a filter device, wherein the filter device comprises a control device and an electrical filter circuit hooked up in parallel with a direct current side of the inverter in a direct current subnetwork, wherein at least one resonance frequency of the filter circuit is adjustable, and wherein the control device is designed to actuate the filter circuit in order to adjust the resonance frequency in dependence on at least one piece of load information describing an alternating current load in the direct current subnetwork.

13 Claims, 2 Drawing Sheets

(51) Int. Cl.
  *B60L 53/20*    (2019.01)
  *H01M 8/04*     (2016.01)
  *H01M 10/42*    (2006.01)
  *H02J 1/02*     (2006.01)
  *H02M 1/15*     (2006.01)
  *H02M 7/48*     (2007.01)
  *H02M 7/5387*   (2007.01)
  *H02P 27/06*    (2006.01)

(52) U.S. Cl.
  CPC .... *H01M 2220/20* (2013.01); *H01M 2250/20* (2013.01)

(58) Field of Classification Search
  CPC .......... H01M 2220/20; H01M 2250/20; H02P 27/06; H02J 1/02
  USPC ....................................................... 307/10.1
  See application file for complete search history.

(56) References Cited

U.S. PATENT DOCUMENTS

| | | |
|---|---|---|
| 2017/0170563 A1 | 6/2017 | Maas |
| 2019/0089171 A1 | 3/2019 | Fischer et al. |
| 2020/0274462 A1* | 8/2020 | Schiedermeier ...... H02M 5/453 |
| 2022/0337185 A1* | 10/2022 | Kiribuchi .................. H02P 6/08 |

FOREIGN PATENT DOCUMENTS

| | | | |
|---|---|---|---|
| DE | 102012220247 | * | 5/2014 |
| DE | 10 2019 117 510 A1 | | 1/2020 |
| DE | 10 2022 203 715 A1 | | 10/2022 |

* cited by examiner

ELECTRICAL CIRCUIT ARRANGEMENT, MOTOR VEHICLE, AND METHOD FOR OPERATING AN ELECTRICAL CIRCUIT ARRANGEMENT

BACKGROUND

Technical Field

Embodiments of the present disclosure relate to an electrical circuit arrangement comprising an inverter and a filter device. Furthermore, embodiments of the disclosure relate to a motor vehicle as well as a method for operating an electrical circuit arrangement.

Description of the Related Art

In electromobility, electrical rotary field machines are generally used as traction motors in motor vehicles. An actuating of the traction motor generally occurs by a power electronic unit, designed as an inverter, which then serves as a linking element between a direct current subnetwork and an alternating current subnetwork of the motor vehicle. Thus, through the inverter, an alternating current for energizing a stator winding of the electrical machine can be generated from a direct current, which can be taken, for example, from a traction battery or a fuel cell. Conversely, through the inverter it is also possible to transform an alternating current generated by the electrical machine in generator mode into a direct current for the charging of a traction battery.

The power pack of the inverter can have an intermediate circuit capacitor hooked up in parallel with an input side of the inverter. The capacitor has the task of filtering currents or signals on the direct current side of the inverter. Through the intermediate circuit capacitor, it is possible, for example, to filter interference imposed on the inverter from the direct current subnetwork of the motor vehicle's onboard network. However, it is also possible to filter interference arising during the operation of the inverter, which is not supposed to get into the direct current subnetwork of the motor vehicle connected to the inverter.

The intermediate circuit capacitor of the inverter can be designed such that it can filter out at least partly the majority of the alternating current portions in the direct current subnetwork. Such an alternating current portion in a direct current network represents a differential mode interference. An energy accumulator which is present in the direct current subnetwork, such as a high-voltage traction battery of a motor vehicle, should be burdened as little as possible with alternating current signals or alternating current interference. The current put out by the traction battery in the motor mode of the electrical machine should correspond as much as possible to an interference-free direct current signal. Also, in a generator mode or a recuperation mode of the electrical machine, the most interference-free direct current should be fed to the battery.

The efficacy of the intermediate circuit capacitor as a filtering measure is determined by the size of its capacitance and by the frequency spectrum of the alternating current portions being filtered. The frequency spectrum of the alternating current portions in the direct current subnetwork may depend on the present actuation of the inverter. Of special influence here is the clock frequency with which the switch elements of the inverter are switched, as well as the modulation or actuation method used for the current transformation in the inverter.

In a capacitor such as an intermediate circuit capacitor, the impedance is given by the following formula:

$$Z_C = 1/(\omega \cdot C),$$

where $Z_C$ is the impedance of the capacitance, co is the circular frequency and C is the capacitance of the capacitor. The higher the frequency, the lower the impedance $Z_C$ of the capacitor, that is, especially at high frequencies there is low impedance and thus a good filter action of the capacitor. Conversely, at low frequencies there is little filtering of the capacitor, so that depending on the design of the capacitance, a good filter action of the intermediate circuit capacitor can only be achieved over a relatively narrow frequency band.

In the case of an inverter operating with varying clock frequencies and/or varying modulation methods, alternating current interference can occur in different frequency ranges, which is a particular challenge for an efficient filtering of the interference through an intermediate circuit capacitor, since due to the high impedance of a capacitor at low frequencies it may be difficult to suppress the interference effectively.

Various approaches are known in the prior art for suppressing the alternating current interference in direct current circuits.

The document DE 10 2006 043 833 A1 describes a circuit arrangement for protection of a consumer in a DC voltage network against low-frequency alternating current interference in particular. For this, a gyrator circuit is used, which can be connected at the input side to the DC voltage network and at the output side to the consumer being protected. The gyrator circuit is used here to simulate inductive behavior.

US 2019/0089171 A1 discloses a device for noncontact energy transmission, intended for charging of electrical motor vehicles. A low pass filter is used for the filtering of alternating current interference in a part of the circuit used for current metering, filtering out from a direct current signal the low-frequency alternating current components corresponding to ripple currents of a metered alternating current.

BRIEF SUMMARY

Embodiments include an electrical circuit arrangement making possible an improved suppression of alternating current interference on the direct current side of an inverter which can be operated in different operating states.

Embodiments include an electrical circuit arrangement of the kind mentioned above, that at least one resonance frequency of a filter circuit is adjustable, wherein a control device is designed to actuate the filter circuit in order to adjust the resonance frequency in dependence on at least one piece of load information describing an alternating current load in the direct current subnetwork.

The electrical filter circuit of the filter device is hooked up in parallel with the direct current side of the inverter. At the resonance frequency of the filter circuit, this has an absolute or at least a local minimum of its frequency-dependent impedance, so that a low-impedance connection is created for alternating currents between the direct current terminals of the inverter. In this way, a current path is provided with a low impedance, through which alternating current interference flowing on the direct current side can drain away. Further components of the direct current subnetwork hooked up in parallel with the inverter, especially an energy accumulator device or an energy source such as a battery or a fuel cell used to energize the inverter, are thus no longer burdened with the alternating current interference.

Thanks to the adjusting of the resonance frequency of the filter circuit in dependence on the load information describing an alternating current load in the direct current subnetwork, it becomes possible to make the frequency-dependent filter action of the filter circuit, i.e., the filtering of frequency-dependent alternating current components, adjustable. In particular, the resonance frequency of the filter circuit can thus be adjusted to the present alternating current load in the direct current subnetwork, so that a variable filtering is created.

Some embodiments include an efficient filtering of interfering alternating current components even in inverters which are operated with variable frequencies or with variable actuation methods. In particular, the adjusting of the resonance frequency can be done in relation to the run time of the inverter, so that the filter action of the filter circuit can be dynamically adapted to the operation of the inverter.

In some embodiments, an adaptable filtering can be done when the inverter is clocked in a large frequency range or can generate alternating current interference in a large frequency range on account of its adaptable actuation or adaptable modulation method. The frequencies or frequency ranges in which the alternating current interference occurs are dependent on the present operating state of the inverter, so that they can change during the run time of the inverter. For example, the inverter can be designed as a bridge inverter comprising multiple half-bridges each formed from two switch elements, especially as a three-phase bridge inverter.

As compared to an intermediate capacitor, the filter circuit with the adjustable resonance frequency can produce an improved filtering of alternating current interference with very low frequency, which may occur, for example, during an actuation of the inverter designed as a block timing or block operation. The clock frequency of the inverter and the electrical fundamental frequency of an electrical motor connected to the inverter can be proportional and identical, and when the motor is used as an electrical traction drive of a motor vehicle the rotary speed of the motor is furthermore proportional to the wheel speed of the motor vehicle. Low-frequency interference may occur in such electrical machines, since motor vehicles often start from standstill or also move at low speeds of travel. Therefore, an improved filtering of interference can also be produced in such modulation methods, for example, interference less than 100 Hz, especially as compared to an exclusive filtering of the interference using an intermediate circuit capacitor.

The electrical circuit arrangement described herein can therefore be used in a motor vehicle, especially for the operation of a traction electric motor, since the efficient filtering of alternating current interference in the direct current subnetwork can relieve the load on a traction energy accumulator, such as a high-voltage traction battery. This can result in longer battery life. Moreover, losses in the energy accumulator can be prevented, so that for the same battery capacitance a longer range of the motor vehicle can be achieved. Furthermore, savings on cost, weight, and design space are possible, since any intermediate circuit capacitor of the inverter which is present can be eliminated or designed with lower capacitance.

In some embodiments, the control device is designed to determine, from the load information, at least one frequency of an alternating current component being filtered, in particular the frequency of the alternating current component with the largest amplitude, within a given frequency range, and to adjust the resonance frequency to the frequency so determined. The frequency range in which a filtering should be done can be determined, e.g., by a frequency range within which the resonance frequency of the filter circuit is adjustable. Furthermore, the frequency range can also depend on an operating frequency range of the inverter within which the clock frequencies of switch elements of the inverter and/or frequency ranges for alternating current interference dictated by the possible actuation method of the inverter are entirely or at least partially contained.

The adjusting of the resonance frequency can be such that the resonance frequency is set to the ascertained frequency of the alternating current component with the largest amplitude. In the case of a resonance frequency of the filter circuit which is adjustable in stages or discrete steps, an adjustment can also be done to a resonance frequency stage which is closest to the ascertained frequency.

By adjusting the resonance frequency to the frequency of an alternating current component being filtered, such as the component with the largest amplitude, the best possible filtering of the interference can be achieved, depending on the operating point. For example, it is possible in the case of interference attributable to the clock frequency of the switch elements that an alternating current interference corresponding to the clock frequency of the fundamental wave will have a larger amplitude than the alternating current interference coordinated with the corresponding harmonics, so that the filtering of the alternating current interference attributable to the switching frequency can be done. Depending on the extent of the alternating current interference, however, other relations are also possible between the alternating current loads which occur and the at least one alternating current component being filtered, so that the desired alternating current component can be filtered for every possible operating state.

The control device can evaluate the load information for determining the frequency of the alternating current component being filtered. For this, at least one computation rule and/or at least one assignment rule, such as one in the form or a table or the like, can be stored in the control device.

In some embodiments, the filter circuit comprises multiple capacitors each being switchable in parallel with the direct current side of the inverter, wherein the resonance frequency of the filter circuit of the control device is adjustable by respectively switching in and/or switching out the capacitors.

The use of multiple capacitors, each of them being hooked up in parallel with the direct current side of the inverter, constitutes one simple option for changing the impedance of the filter circuit and thus also the resonance frequency of the filter circuit. The capacitors here can each have capacitance values, especially partly different values, so that an overall capacitance resulting from the capacitors respectively switched in can be adjusted or established over a large range of values. In this way, the resonance frequency and thus also the filter action of the filter circuit can likewise be established over a large range of values. The capacitors can each be realized for example as foil capacitors or as electrolyte capacitors. Alternatively, the use of other capacitor technologies for at least some of the capacitors is possible.

In some embodiments, the capacitors can be switched in and/or switched out each time by a switch element of the filter circuit hooked up in series with the capacitor, wherein the control device is connected to the switch elements and is designed for the switching of the switch elements. Depending on the load information, the control device can thus switch in or switch out the individual capacitors by making or breaking the switch elements and thereby adjust the resonance frequency of the filter circuit. In dependence on the alternating current loads described by the load information, it is possible to switch in one of the capacitors, any possible subset of available capacitors, or all of the capacitors.

The switch element can be designed, for example, as a semiconductor switch. The semiconductor switch may be a transistor, such as a bipolar transistor with insulating gate (IGBT), or a metal oxide semiconductor field effect transistor (MOSFET). Different semiconductor technologies can be used for the semiconductor switch elements, such as silicon (Si), silicon carbide (SiC) and/or gallium nitride (GaN). Alternatively, the switch elements can also be designed as a contactor or a relay.

In some embodiments, at least one resonance frequency formed from the capacitors switched in and at least one line inductance in the direct current subnetwork and/or at least one inductance element of the filter device is adjustable. The inductance element can be hooked up in a branch connecting the filter circuit to the direct current side, i.e., a DC-Plus branch or a DC-Minus branch, and be designed, for example, as a coil. In this way, a drain circuit can be formed by the capacitors which can be switched in and the inductance element, and its resonance frequency, will depend on the overall capacitance of the capacitors switched in. By switching in or switching out the individual capacitors, a frequency adjustment of the resonance frequency of the drain circuit can be accomplished. In addition or alternatively to the line inductance, it is also possible to use a discrete inductance component. This can also be hooked up alternatively in parallel with the capacitors. In this case as well, one gets an adjustable resonance frequency, which can be adjusted by switching in or switching out individual capacitors.

In addition or alternatively, to the use of a discrete inductance element, it is also possible to use a line inductance or the stray inductance of a line between the filter circuit and the inverter. In this case, a drain circuit is formed from the line inductance and the capacitors of the filter circuit, and by switching in or switching out individual capacitors, the resonance frequency of the drain circuit can be adjusted. The line inductance can be, for example, the inductance of one or more electrical lines running between the filter circuit and the direct current side of the inverter. Since such a line inductance is present in any case, such as in a connection realized by at least one cable, there are no additional costs incurred for an extra component. Moreover, the weight and the design space taken up by the filter circuit can also be reduced, since the use of an inductance element such as a coil is not necessary.

The more capacitors used, that is, the more parallel, capacitive paths provided, the more precisely the resonance frequency can be established. For example, the larger the inductance or the larger the sum of the capacitances of the parallel switched capacitors, the lower the minimum attainable resonance frequency of the filter circuit or the drain circuit can be. The resonance frequency of such a filter circuit designed as a drain circuit can be expressed approximately by the formula:

$$f_{res} = \frac{1}{2\pi \cdot \sqrt{L_S \cdot \sum C_{S,n}}}$$

where $f_{res}$ describes the resonance frequency, $L_S$ the inductance of the drain circuit, and $C_{S,n}$ the capacitances of the capacitors switched in.

In some embodiments, the direct current subnetwork comprises an electrical energy source, such as a battery or a fuel cell, wherein the filter circuit is arranged in a housing of the electrical energy source. In this way, a relatively long electrical line between the filter circuit inside the electrical energy source and the inverter, and thus a relatively long line inductance, can be used. Moreover, the interference which occurs can be filtered out directly before the electrical energy source being protected.

The electrical energy source can be a high-voltage traction battery or a fuel cell. The electrical energy source comprises a housing, which for example, in the case of a battery, surrounds the battery cells and/or other components of the battery. The filter circuit can also be arranged inside this housing. Accordingly, in the case of a fuel cell as well, the filter circuit can be arranged in a housing surrounding the components of the fuel cell.

It is possible to also arrange the control device of the filter device in the housing, besides the filter circuit. Alternatively, the control device can also be arranged outside the housing of the electrical energy source. Besides the arrangement of the filter circuit in the housing of the energy source, an arrangement as a separate component connected to the direct current subnetwork is also possible.

In some embodiments, the load information comprises at least one measured value describing an alternating current portion in the direct current subnetwork and/or at least one operating point information describing a present operating point of the inverter. The determination of the measured value can be done, e.g., by at least one current sensor in the direct current subnetwork. The use of the at least one measured value has the advantage that a filtering of at least one alternating current component can be done regardless of which effect is responsible for the occurrence of this interference, since the filtering can be done merely on the basis of the occurrence or the measuring of the alternating current component.

In addition or alternatively, the load information can also involve operating point information describing the present operating point of the inverter. The operating point information, which describes the present operating point of the inverter, especially in regard to a switching frequency of switch elements of the inverter and/or an actuation method which is used, can be relayed, e.g., by a controller of the inverter to the control device of the filter device. Alternatively, it is possible for the control device of the filter circuit to also be designed to operate the inverter and to itself determine the operating point information, for example, in dependence on operator input of a user and/or information from other controllers of a motor vehicle relayed to the control device.

In some embodiments, the electrical circuit arrangement comprises an electrical machine, wherein an alternating current side of the inverter is connected to the electrical machine. The alternating current side of the inverter can be connected to a stator winding of the electrical machine, especially a three-phase stator winding. The inverter can be designed for the energizing of a machine designed as a traction electric motor of a motor vehicle and be connected to such.

Some embodiments of a motor vehicle described herein comprises a circuit arrangement.

All of the benefits and embodiments described above in relation to the electrical circuit arrangement hold accordingly for the motor vehicle described herein and vice versa.

A method may be provided for operating an electrical circuit arrangement comprising an inverter and a filter device, wherein the filter device comprises a control device and an electrical filter circuit hooked up in parallel with a direct current side of the inverter in a direct current subnetwork, wherein at least one resonance frequency of the filter circuit is adjustable, and wherein the control device is designed to adjust the resonance frequency in dependence on at least one piece of load information describing an alternating current load in the direct current subnetwork.

In some embodiments, the control device determines, from the load information, at least the frequency of an alternating current component being filtered, such as the frequency of the alternating current component with the largest amplitude, within a given frequency range, and adjusts the resonance frequency to the frequency so determined.

In some embodiments, a filter circuit is used which comprises multiple capacitors each being switchable in parallel with the direct current side of the inverter, wherein the resonance frequency of the filter circuit of the control device is adjustable by respectively switching in and/or switching out the capacitors.

In some embodiments, capacitors are used which can be switched in and/or switched out each time by a switch element of the filter circuit hooked up in series with the capacitor, wherein the control device is connected to the switch elements and switches the switch elements in dependence on the load information.

In some embodiments, at least one resonance frequency formed from the capacitors switched in and at least one line inductance in the direct current subnetwork and/or at least one inductance element of the filter device is adjusted.

In some embodiments, a direct current subnetwork is used having an electrical energy source, such as a battery or a fuel cell, wherein the filter circuit is arranged in a housing of the electrical energy source.

In some embodiments, load information can be used which comprises at least one measured value describing an alternating current portion in the direct current subnetwork and/or at least one operating point information describing a present operating point of the inverter.

In some embodiments, an electrical circuit arrangement is used which comprises an electrical machine, which is connected to an alternating current side of the inverter.

In some embodiments, the method is carried out in an electrical circuit arrangement which is part of a motor vehicle, the electrical circuit arrangement serving in particular for the operation of an electrical traction motor of the motor vehicle.

All of the benefits and embodiments described above in regard to the electrical circuit device described herein also hold accordingly for the method, and vice versa.

BRIEF DESCRIPTION OF THE SEVERAL VIEWS OF THE DRAWINGS

Further benefits and details will emerge from the following described embodiments as well as the drawings.

DETAILED DESCRIPTION

Figure 1:
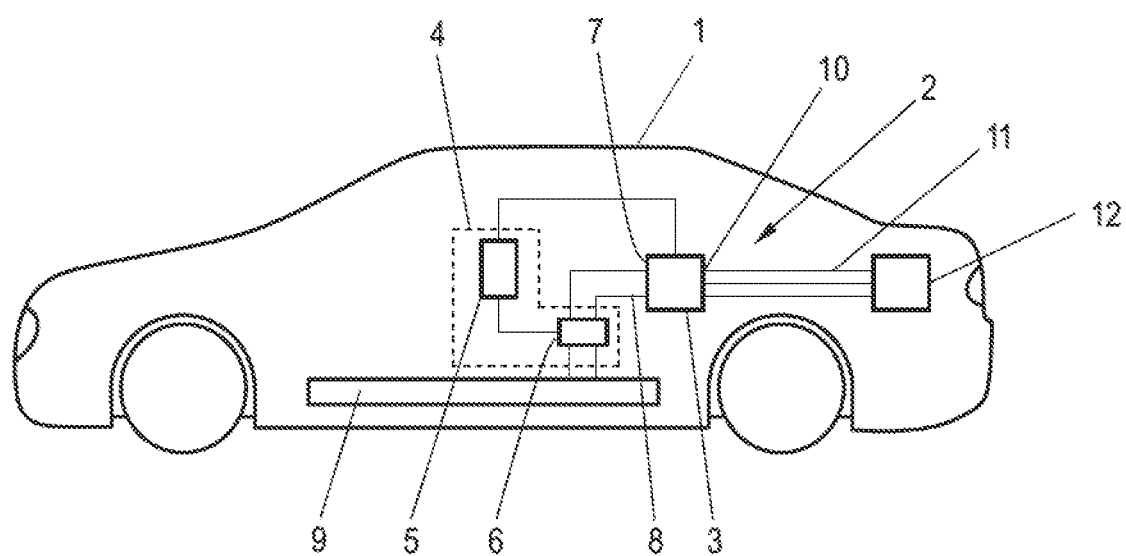
FIG. 1 shows an embodiment of a motor vehicle comprising an embodiment of an electrical circuit arrangement.

FIG. 1 shows an embodiment of a motor vehicle 1. The motor vehicle 1 has an electrical circuit arrangement 2. The electrical circuit arrangement 2 comprises an inverter 3 and a filter device 4, while the filter device 4 comprises a control device 5 and an electrical filter circuit 6. The electrical filter circuit 6 is hooked up in parallel with a direct current side 7 of the inverter 3 and arranged in a direct current subnetwork 8 of the electrical circuit arrangement 2.

The motor vehicle 1 furthermore comprises an electrical energy source 9, which is connected to the inverter 3 across the direct current subnetwork 8. On an alternating current side 10 of the inverter 3, the latter is connected to an alternating current subnetwork 11 of the motor vehicle, the alternating current subnetwork 11 comprising an electrical machine 12 of the motor vehicle 1. The electrical machine 12 is designed as a traction motor of the motor vehicle 1.

The electrical energy accumulator 9 is configured, for example, as a high-voltage traction battery of the motor vehicle 1, while the battery potential $U_{Bat}$ can amount to between 200 V and 1200 V, for example. Alternatively, the energy accumulator 9 can also be configured as a fuel cell. Through the inverter 3, a direct current taken from the electrical energy accumulator 9 can be transformed into a three-phase alternating current for energizing the electrical machine 12.

Conversely, alternating current produced in a generator mode of the electrical machine 12 can be transformed into a direct current, for example, for charging an energy source 9 designed as a battery.

Figure 2:
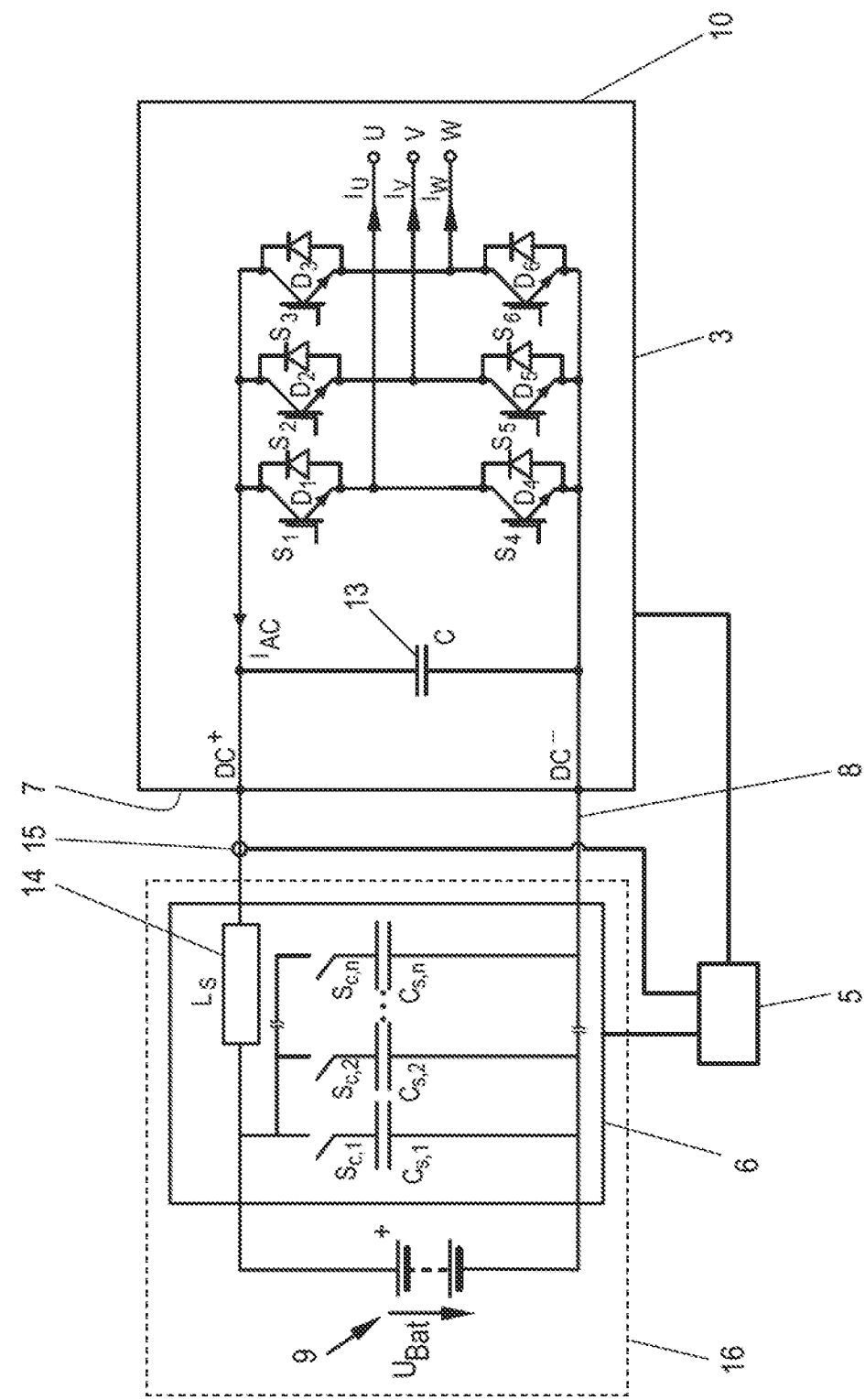
FIG. 2 shows a circuit diagram of the embodiment of the electrical circuit arrangement according to a method.

FIG. 2 shows a circuit diagram of the electrical circuit arrangement 2. The inverter 3 is designed as a three-phase bridge inverter and comprises three half bridges, each one formed of two switch elements $S_1$-$S_6$. Furthermore, the inverter 3 comprises multiple freewheeling diodes $D_1$ to $D_6$, each one hooked up in parallel with one of the switch elements $S_1$-$S_6$. The bridge branches of the respective half bridges form the phases U, V, W, which serve for energizing a three-phase stator winding of the electrical machine 12, not represented here.

Due to the switching of the switch elements $S_1$-$S_6$ during the operation of the inverter 3, alternating current interference may arise, which can retroactively affect the direct current subnetwork 8 of the electrical circuit arrangement 2. The resulting alternating current interference, shown schematically as a current $I_{AC}$, can have variable frequencies or variable frequency portions, which depend in particular on the switching frequencies of the switch elements $S_1$-$S_6$. In addition or alternatively, the frequencies of the alternating current interference can also depend on the actuation method of the switch elements $S_1$-$S_6$ of the inverter 3.

The inverter 3 can comprise an intermediate circuit capacitor 13 hooked up in parallel at the direct current side 7, the capacitance C of which can be used to filter the alternating current portions or alternating current components in the direct current subnetwork 8. In particular, the intermediate circuit capacitor 13 can serve for filtering of high-frequency interference.

For example, during operation of the inverter 3 using block timing or block operation of the inverter 3, low-frequency interference can also arise and this can only be inadequately filtered out by the intermediate circuit capacitor 13. This can be the case, in particular, when the switching speed or the clock frequency of the switch elements $S_1$-$S_6$ is proportional to the rotary speed of the electrical machine 12, so that, for example, low-frequency alternating current interference may arise in the direct current subnetwork 8 upon starting of the motor vehicle 1 and/or in other situations where a low number of revolutions of the electrical machine 12 exists. The filter device 4 is intended for the additional filtering of this low-frequency interference, its filter circuit 6 being hooked up in parallel with the direct current side 7 of the inverter 3.

The filter circuit 6 comprises multiple capacitors $C_{S,1}$-$C_{S,n}$, each of which can be hooked up in parallel with the direct current side 7 of the inverter 3. For this, each of the capacitors $C_{S,1}$-$C_{S,n}$ can be hooked up in parallel with the direct current side 7 of the inverter 3 across a switch element $S_{C,1}$-$S_{C,n}$ hooked up in series with the respective capacitor $C_{S,1}$-$C_{S,n}$. Accordingly, capacitors $C_{S,1}$-$C_{S,n}$ hooked up in parallel with the direct current side 7 of the inverter 3 can also be cut off or switched out once again by opening the respective switch element $S_{C,1}$-$S_{C,n}$. The capacitors $C_{S,1}$-$C_{S,n}$ can be designed, for example, as foil capacitors or as electrolyte capacitors. The switch elements $S_{C,1}$-$S_{C,n}$ can be designed as a semiconductor switch or as a transistor, such as an IGBT or as a MOSFET. A design as a relay or contactor is also possible.

Thanks to the capacitors $C_{S,1}$-$C_{S,n}$ which can be switched in and switched out, the resonance frequency of the filter circuit 6 can be adjusted. For this, the control device 5 of the filter device 4 is adapted to actuate the switch elements $S_{C,1}$-$S_{C,n}$ and switch them, that is, switch them between an open and a closed state. The respective connections between the control device 5 and the switch elements $S_{C,1}$-$S_{C,n}$ are not shown in FIG. 2 for reasons of clarity. The capacitors $C_{S,1}$-$C_{S,n}$ can have different capacitance values, at least in part, and also capacitance values of different orders of magnitude, so that different overall capacitances can be formed from the particular capacitors $C_{S,1}$-$C_{S,n}$ which are switched in.

The capacitors $C_{S,1}$-$C_{S,n}$ together with the inductance $L_S$ form a drain circuit, the resonance frequency of which can be adjusted by switching in and switching out individual capacitors $C_{S,1}$-$C_{S,n}$. Thus the frequency of a series resonance of the filter circuit 6 configured as a drain circuit is changed in this way. The inductance $L_S$ can be a line inductance or a stray inductance of at least one electrical line of the direct current subnetwork 8 which connects the filter circuit 6 to the direct current side 7 of the inverter 3. In addition or alternatively, the filter circuit 6 can include an inductance element 14 which is hooked up between the capacitors $C_{S,1}$-$C_{S,n}$ and a terminal on the direct current side, in the present case, a DC-Plus terminal of the inverter 3.

In order to make possible an adjusting of the resonance frequency of the filter circuit 6 during the run time of the electrical circuit arrangement 2, in one embodiment of a method for operating the electrical circuit arrangement 2, the resonance frequency of the filter circuit 6 is adjusted by the control device 5 in dependence on load information describing an alternating current load in the direct current subnetwork 8.

From this load information the control device can ascertain the frequency of an alternating current component being filtered, for example, the frequency of the alternating current component with the largest amplitude within a given frequency range. For example, the load information may include at least one measured value describing an alternating current portion in the direct current subnetwork and/or at least one operating point information describing a present operating point of the inverter.

The control device 4 then adjusts the resonance frequency of the filter circuit 6 in dependence on the ascertained frequency. For this, the capacitors $C_{S,1}$-$C_{S,n}$ can be switched in or switched out in order to establish a resonance frequency of the filter circuit 6 as close as possible to the ascertained frequency. For this, a single one of the capacitors $C_{S,1}$-$C_{S,n}$ can be switched in, or a subset or all of the capacitors $C_{S,1}$-$C_{S,n}$ can be switched in. The ascertained frequency of the alternating current component being filtered can be established as accurately as possible, or the capacitors $C_{S,1}$-$C_{S,n}$ will be switched in such that the deviation from the ascertained frequency is as slight as possible.

The adjusting of the resonance frequency has the effect that the filter circuit, that is, the drain circuit formed by the inductance $L_S$ and the capacitors $C_{S,1}$-$C_{S,n}$, has an absolute or at least a local, frequency-dependent impedance minimum at the ascertained frequency. In this way, the alternating current interference $I_{AC}$ can be drained by the filter circuit 6, without burdening the energy source 9.

In order to ascertain the load information, the control device 4 can be connected to a current sensor 15, by which at least the alternating current portion $I_{AC}$ in the direct current subnetwork 8 can be measured. In addition or alternatively, the load information can involve operating point information describing the present actuation of the inverter 3 and/or the present switching frequency of the switch elements $S_1$-$S_6$ of the inverter 3. The control device 5 may obtain the operating point information, for example, from another controller (not shown) of the motor vehicle 1 via a communication link (not shown), the other controller being adapted, e.g., to operate the inverter 3.

Alternatively, the control device 5 can also be designed to operate the inverter 3 and can itself ascertain the corresponding operating point information of the inverter 3, especially on the basis of measured values and/or operator input ascertained, for example, in preparation of a driving operation of the motor vehicle 1. The adjusting of the resonance frequency of the filter circuit 6 will be done continuously during the operation of the motor vehicle 1 by switching in and/or switching out individual capacitors $C_{S,1}$-$C_{S,n}$ depending on the present operating state of the inverter 3. This makes possible the best possible interference compensation of alternating current interference in the direct current subnetwork 8 during a driving operation of the motor vehicle 1, accompanied by changing numbers of revolutions of the electrical machine 12 and different switching frequencies of the switch elements $S_1$-$S_6$ of the inverter 3 and/or different operating point-dependent actuation or modulation methods of the inverter 3.

The filter circuit 6 can be arranged in a housing 16 of the electrical energy source 9. Alternatively, the filter circuit 6 can also be arranged elsewhere in the direct current subnetwork 8. The control device 5 of the filter device 4 can likewise be arranged inside the housing 16. Alternatively, the control device 5 can also be arranged elsewhere inside the motor vehicle 1.

German patent application no. 10 2022 107475.7, filed Mar. 30, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. An electrical circuit arrangement, comprising:
an inverter; and
a filter device,
  wherein the filter device includes a control device and an electrical filter circuit hooked up in parallel with a direct current side of the inverter in a direct current subnetwork, wherein the inverter includes an intermediate circuit capacitor having a first end connected to a first terminal on the direct current side of the inverter, and a second end connected to a second terminal different from the first terminal on the direct current side of the inverter, wherein the electrical filter circuit includes a plurality of capacitors, a plurality of switches respectively corresponding to the plurality of capacitors, and an inductance element having a first end connectable to the plurality of capacitors via the plurality of switches and a second end connected to the first terminal on the direct current side the inverter, wherein each of the plurality of capacitors includes a first end connected to a respective one of the plurality of switches, and a second end connected to the second terminal on the direct current side the inverter, wherein a resonance frequency of the electrical filter circuit is adjustable, and wherein the control device actuates the electrical filter circuit to adjust the resonance frequency based on at least one piece of load information describing an alternating current load in the direct current subnetwork.

2. The electrical circuit arrangement according to claim 1, wherein the control device is configured to determine, from the load information, at least one frequency of an alternating current component being filtered within a given frequency range, and to adjust the resonance frequency to the frequency so determined.

3. The electrical circuit arrangement according to claim 1, wherein each of the capacitors is switchable in parallel with the direct current side of the inverter, and wherein the resonance frequency of the electrical filter circuit of the control device is adjustable by switching in and/or switching out the capacitors.

4. The electrical circuit arrangement according to claim 3, wherein the capacitors can be switched in and/or switched out each time by a switch element of the electrical filter circuit hooked up in series with the capacitor, wherein the control device is connected to the switch elements and is designed for the switching of the switch elements.

5. The electrical circuit arrangement according to claim 3, wherein the inductance element of the filter device is adjustable.

6. The electrical circuit arrangement according to claim 1, wherein the direct current subnetwork includes an electrical energy source, and the electrical filter circuit is arranged in a housing of the electrical energy source.

7. The electrical circuit arrangement according to claim 6, wherein the electrical energy source is a battery or a fuel cell.

8. The electrical circuit arrangement according to claim 1, wherein the load information includes at least one measured value describing an alternating current portion in the direct current subnetwork and/or at least one operating point information describing a present operating point of the inverter.

9. The electrical circuit arrangement according to claim 1, wherein the electrical circuit arrangement includes an electrical machine, wherein an alternating current side of the inverter is connected to the electrical machine.

10. A motor vehicle, comprising:
the electrical circuit arrangement according to claim 1.

11. A method comprising:
providing an electrical circuit arrangement that includes an inverter and a filter device, wherein the filter device includes a control device and an electrical filter circuit hooked up in parallel with a direct current side of the inverter in a direct current subnetwork, wherein the inverter includes an intermediate circuit capacitor having a first end connected to a first terminal on the direct current side of the inverter, and a second end connected to a second terminal different from the first terminal on the direct current side of the inverter, wherein the electrical filter circuit includes a plurality of capacitors, a plurality of switches respectively corresponding to the plurality of capacitors, and an inductance element having a first end connectable to the plurality of capacitors via the plurality of switches and a second end connected to the first terminal on the direct current side the inverter, and wherein each of the plurality of capacitors includes a first end connected to a respective one of the plurality of switches, and a second end connected to the second terminal on the direct current side the inverter; and adjusting a frequency of the electrical filter circuit based on at least one piece of load information describing an alternating current load in the direct current subnetwork.

12. The method according to claim 11, wherein the electrical circuit arrangement includes a current sensor connected to the first terminal on the direct current side the inverter, and wherein the adjusting is based on a current in the direct current subnetwork measured by the current sensor.

13. The electrical circuit arrangement according to claim 1, further comprising:
a current sensor connected to the first terminal on the direct current side the inverter,
wherein the current sensor, in operation, measures a current in the direct current subnetwork, and
wherein the wherein the control device, in operation, actuates the electrical filter circuit to adjust the resonance frequency based on the current in the direct current subnetwork measured by the current sensor.

* * * * *